Figure 1:
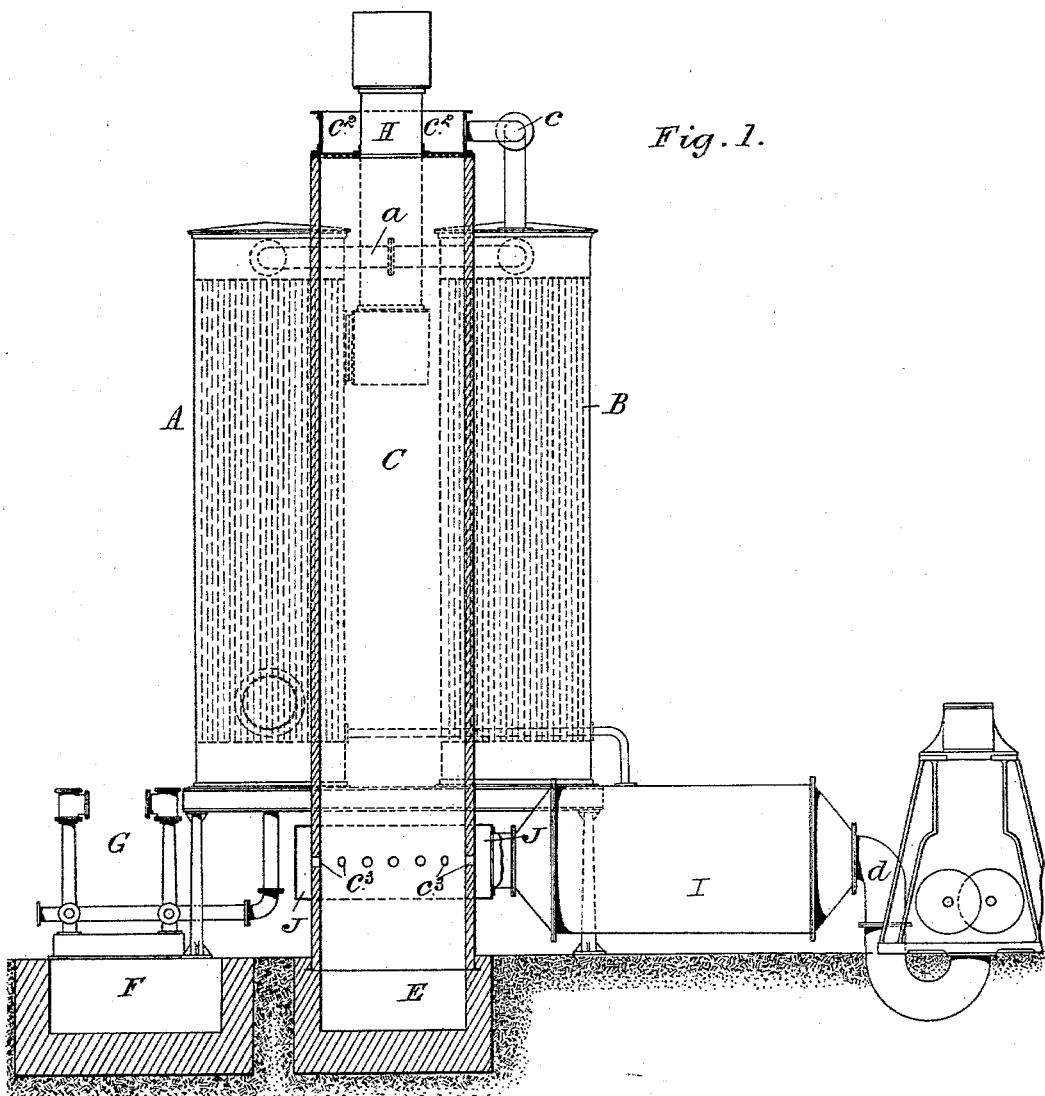

(No Model.)  2 Sheets—Sheet 1.

E. J. DUFF.
EVAPORATING APPARATUS.

No. 598,079. Patented Feb. 1, 1898.

Attest:
Inventor:—
Edward J. Duff

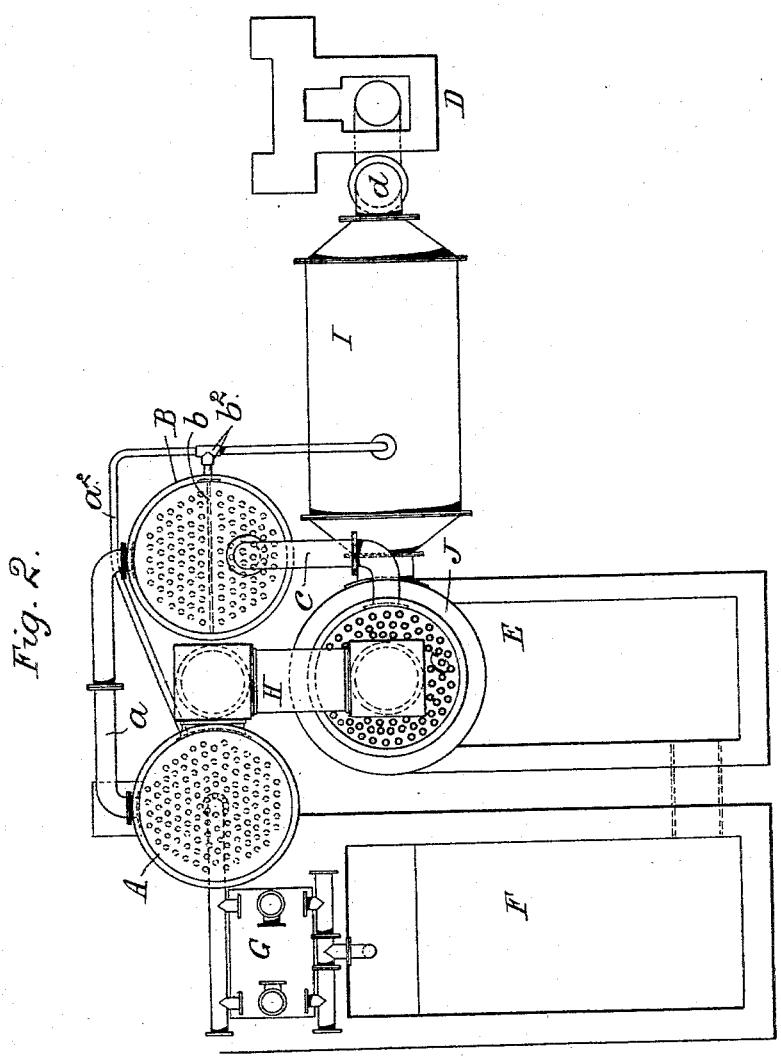

UNITED STATES PATENT OFFICE.

EDWARD JAMES DUFF, OF LIVERPOOL, ENGLAND, ASSIGNOR TO THE UNITED ALKALI COMPANY, LIMITED, OF SAME PLACE.

EVAPORATING APPARATUS.

SPECIFICATION forming part of Letters Patent No. 598,079, dated February 1, 1898.

Application filed April 26, 1897. Serial No. 633,956. (No model.)

*To all whom it may concern:*

Be it known that I, EDWARD JAMES DUFF, engineer, a subject of the Queen of Great Britain and Ireland, residing at G11 Exchange Buildings, Liverpool, in the county of Lancaster, England, have invented certain Improvements in Evaporating Brine and other Solutions and in Apparatus Therefor, of which the following is a specification.

Many attempts have been made to apply the "multiple effect vacuum evaporating process" to the evaporation of solutions, but so far with little success. The difficulty of removing the salts or solids from vessels under vacuum and the rapidity with which the numerous heating-tubes of such apparatus are rendered inefficient by incrustation are causes which have contributed to the failure of the system of evaporating solutions by multiple effect *in vacuo.*

This invention has for its object to effect the evaporation of solutions in such manner that the actual process of evaporation and the consequent separation of salts or solids shall take place in one vessel of simple construction not liable to become inefficient by incrustation, and that the supply of the necessary heat shall take place or mainly take place in another vessel in which there shall be no deposit of salts or solids and in which a considerable amount of the heat applied for effecting the evaporation shall be recovered from the vapor given off from the solution.

In order that this invention may be clearly understood and to simplify the description, I will describe, with reference to the accompanying drawings, the process and apparatus as applied to the evaporation of brine, though the said apparatus may be used for the evaporation of any other solutions which are not injured by contact with air, the said apparatus being of course modified, if necessary, to suit individual circumstances—for example, by the addition of crystallizing-tanks.

Figure 1 is a vertical section, and Fig. 2 is a plan of apparatus constructed according to this invention.

It consists of two tubular heaters A and B through which the brine passes on its way to the evaporating vessel C, hereinafter called the "evaporator." The first heater A is heated by means of the steam given off by the brine in the evaporator C, and the second heater B is heated by a separate source of heat—such, for example, as the waste steam of an engine or by live steam. In passing through these heaters A and B the brine is heated as nearly to its boiling-point as is practicable. The heated brine is then conveyed to the evaporator C, which is preferably a vertical cylindrical vessel of considerable height, through which the brine descends in thin streams or in the form of spray. This current of hot air, which is forced through the evaporator C by means of a fan-pump or blower D, meets the hot brine and takes up as much vapor as the vapor-tension and the temperature of the brine will permit. The heat necessary for the evaporation is furnished partly by the hot air and partly by the hot brine itself, which in descending through the evaporator C becomes cooled. This cooled brine flows into a tank E, which forms the bottom of the evaporator C, where it deposits the salt. This tank E extends outward from the bottom of the evaporator C, as seen in the plan, and is open to the atmosphere, but is luted off by a seal plate or continuation of the evaporator dipping sufficiently deeply into the brine to prevent the escape of the internal heated air, which is under a pressure somewhat greater than atmospheric pressure. This arrangement permits the continuous withdrawal, or fishing, either by mechanical fishing apparatus or by hand, of the salt which has separated. The cooled brine from which salt has been separated flows into another tank or other tanks (such a tank is shown at F) and is then pumped (together with as much fresh filtered brine as is necessary to replace the water evaporated) by the pumps at G again through the two heaters A and B and passes again through the evaporator C, and thus circulates continuously through the apparatus. The air and vapor which leave the top of the evaporator C are conveyed through a pipe H to the first heater A, which may consist of an ordinary tubular arrangement, the air and steam from the evaporator C passing around the pipes, while the brine flows in a contrary direction through the pipes, or vice versa. The brine thus takes up the latent heat of the said air and vapor, and this constitutes a second effect. The condensed water flowing from the heaters and steam-jacket may be utilized to heat the air necessary for the process or for heating the fresh brine, or for both purposes, by causing such condensed water to surround and flow in one direction along a number of pipes, while the air or the brine flows, or both flow, in an opposite direction through the pipes, or vice versa, the air being further heated either by live or exhaust steam or directly by fuel. It will be evident that the second effect may be dispensed with, in which case the steam or vapor given off by evaporation in the evaporator C will escape into the atmosphere and only one heater will be necessary. All external surfaces of the apparatus should be protected against loss of heat by radiation.

The details of the arrangement and connection of the apparatus may of course be varied. In the arrangement illustrated the brine is pumped from the well F by the pumps at G, which deliver the said brine through the tubes in the tubular heater A. The brine leaves the heater A at the top and passes by the pipe $a$ to the heater B, the top portion of which is divided into two compartments by a vertical partition-plate $b$. The brine passes downward through the half of the number of tubes which open into one of the said compartments and ascends through the other half of the number of tubes, when it issues properly heated into the other of the compartments at the top of the heater and passes by the pipe $c$ into the chamber $c^2$ at the top of the evaporator C, the bottom of which chamber constituting the top of the evaporator C consists of a perforated plate, so that as the brine passes therethrough it is divided into spray or fine streams, and in its descent through the evaporator C the said brine meets a current of air, which enters through the opening $c^3$, disposed around the evaporator C at the lower part thereof, the said air being propelled by the blower D through the pipe $d$ and a tubular heater I into the jacket J, surrounding the evaporator C at the part where the openings $c^3$ are situated. The said air is heated by the condensed water passing by the pipes $a^2$ $b^2$ from the bottom of the heaters A and B into the heater I.

Having now particularly described and ascertained the nature of my said invention and in what manner the same is to be performed, I declare that what I claim is—

An evaporating apparatus comprising a vertically-disposed evaporating-chamber free from internal heating devices as specified, provided at its lower end with an air-inlet pipe or conduit through which air is introduced, and at its upper end with an outlet pipe or conduit for the exhaust vapors or steam, an inlet pipe or conduit located at the top of the evaporator through which the liquid to be evaporated is introduced in a divided state; and two independent heaters adjacent to the evaporator each having separate circulating-conduits for the liquid and for a heating medium, the liquid-conduit of the first heater connecting with a source of liquid-supply and discharging into the conduit for liquid of the second heater, which in turn is connected with the liquid-inlet pipe or conduit entering the evaporating-chamber, the heating-conduit of the first heater being connected with the outlet pipe or conduit at the top of the evaporator for the exhaust vapors or steam, whereby the latter are conducted through said heater, and the heating-conduit of the second heater being adapted for connection with a separate source of heat, substantially as described.

In testimony whereof I have signed my name to this specification in the presence of two subscribing witnesses.

EDWARD JAMES DUFF.

Witnesses:
CHARLES PHILLIPS,
MARCUS SPROAL.